(12) United States Patent
Suleman et al.

(10) Patent No.: US 10,872,109 B2
(45) Date of Patent: *Dec. 22, 2020

(54) GENERATING CUSTOMIZED CONTENT

(71) Applicant: Google LLC, Mountain View, CA (US)

(72) Inventors: Dani Suleman, Fremont, CA (US);
Hobart Sze, Mountain View, CA (US)

(73) Assignee: Google LLC, Mountain View, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/018,843

(22) Filed: Jun. 26, 2018

(65) Prior Publication Data

US 2018/0300329 A1    Oct. 18, 2018

Related U.S. Application Data

(63) Continuation of application No. 15/667,802, filed on Aug. 3, 2017, now Pat. No. 10,019,443, which is a
(Continued)

(51) Int. Cl.
*G06F 16/435* (2019.01)
*G06F 16/335* (2019.01)
(Continued)

(52) U.S. Cl.
CPC ........ *G06F 16/435* (2019.01); *G06F 16/2455* (2019.01); *G06F 16/335* (2019.01); *G06F 16/951* (2019.01); *G06F 16/9535* (2019.01); *G06Q 30/0269* (2013.01); *G06Q 50/01* (2013.01); *G06F 16/24578* (2019.01); *H04L 67/18* (2013.01)

(58) Field of Classification Search
None
See application file for complete search history.

(56) References Cited

U.S. PATENT DOCUMENTS 6,892,226 B1   5/2005   Tso et al.
7,158,943 B2 *  1/2007   van der Riet .......... G06Q 30/02
                                                          705/14.41
(Continued)

OTHER PUBLICATIONS

"How do I Create Sponsored Messages in Messenger?", 3 pages.
(Continued)

*Primary Examiner* — Kim T Nguyen
(74) *Attorney, Agent, or Firm* — Foley & Lardner LLP; James De Vellis

(57) ABSTRACT

Example techniques for generating customized content may include the following operations: receiving a search query from a computing device associated with a user; performing a search of electronic content based on the search query; obtaining a search result based on the search of electronic content; obtaining configurable content that relates to the search query, where the configurable content includes a field that is configurable; identifying user-specific content based on the search query; configuring the field of the configurable content based on the user-specific content to thereby produce configured content; and outputting data corresponding to the search result and the configured content for use in generating a Web page containing the search result and the configured content.

20 Claims, 8 Drawing Sheets

Related U.S. Application Data continuation of application No. 15/059,035, filed on Mar. 2, 2016, now Pat. No. 9,734,518, and a continuation of application No. 13/957,648, filed on Aug. 2, 2013, now Pat. No. 9,286,397.

(60) Provisional application No. 61/707,539, filed on Sep. 28, 2012.

(51) Int. Cl.

| | |
|---|---|
| *G06F 16/951* | (2019.01) |
| *G06F 16/2455* | (2019.01) |
| *G06F 16/9535* | (2019.01) |
| *G06Q 30/02* | (2012.01) |
| *G06Q 50/00* | (2012.01) |
| G06F 16/2457 | (2019.01) |
| H04L 29/08 | (2006.01) |

(56) References Cited

U.S. PATENT DOCUMENTS

| | | | |
|---|---|---|---|
| 7,254,547 B1 | 8/2007 | Beck et al. | |
| 7,523,387 B1 | 4/2009 | Greenwald et al. | |
| 7,668,885 B2* | 2/2010 | Wittke | G06N 5/00 707/705 |
| 7,805,429 B2* | 9/2010 | Abrams | G06Q 30/02 707/706 |
| 7,873,621 B1* | 1/2011 | Datar | G06Q 30/02 707/706 |
| 7,941,340 B2 | 5/2011 | Doemling et al. | |
| 8,200,662 B2* | 6/2012 | Reitter | G06F 40/258 707/722 |
| 8,260,725 B2* | 9/2012 | Crawford | G06Q 30/02 705/319 |
| 8,321,462 B2 | 11/2012 | Nance et al. | |
| 2001/0020242 A1 | 9/2001 | Gupta | |
| 2003/0191685 A1 | 10/2003 | Reese | |
| 2006/0293065 A1 | 12/2006 | Chew et al. | |
| 2007/0100688 A1 | 5/2007 | Book | |
| 2008/0104026 A1 | 5/2008 | Koran | |
| 2008/0140508 A1 | 6/2008 | Anand et al. | |
| 2008/0243526 A1 | 10/2008 | Nance et al. | |
| 2008/0282294 A1 | 11/2008 | Carpenter et al. | |
| 2008/0319839 A1 | 12/2008 | Olliphant et al. | |
| 2009/0063284 A1 | 3/2009 | Turpin et al. | |
| 2009/0070219 A1 | 3/2009 | D'Angelo et al. | |
| 2009/0156190 A1 | 6/2009 | Fisher | |
| 2009/0198711 A1 | 8/2009 | Datar et al. | |
| 2009/0254412 A1 | 10/2009 | Braswell et al. | |
| 2009/0299860 A1 | 12/2009 | Yount et al. | |
| 2010/0076851 A1 | 3/2010 | Jewell, Jr. | |
| 2010/0100607 A1* | 4/2010 | Scholz | G06F 16/355 709/219 |
| 2010/0180300 A1 | 7/2010 | Carpenter et al. | |
| 2010/0251304 A1* | 9/2010 | Donoghue | H04N 5/44543 725/46 |
| 2011/0040586 A1 | 2/2011 | Murray et al. | |
| 2011/0054991 A1 | 3/2011 | Orellana et al. | |
| 2011/0055017 A1 | 3/2011 | Solomon et al. | |
| 2012/0209872 A1* | 8/2012 | Woods | G06F 16/9535 707/769 |
| 2012/0233243 A1* | 9/2012 | Ashkenazy | G06Q 30/00 709/203 |
| 2012/0239663 A1* | 9/2012 | Tzruya | G06F 16/9535 707/741 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

"Walmart and Google to offer voice-enabled shopping", BBC News, Aug. 23, 2017, 10 pages.

Abrams, Help users find, interact & re-engage with your app on the Google Assistant, Google Developers Blog, Nov. 15, 2017, 16 pages.

Addybot "Chatbot Advertising Platform", 5 pages.

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017, 7 pages.

Baesler, Christian "Lunch Bot, Anyone? How Brands Can use Chatbots in Advertising" Published on Jul. 22, 2016, 10 pages.

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017, 7 pages.

Buckland et al., "Amazon's Alexa Takes Open-Source Route to Beat Google Into Cars", Bloomberg, Feb. 27, 2018, 6 pages.

Chandler, Simon "Chatbots are the Future of Advertising", 8 pages.

Chen, Lulu Yilun, "Alibaba Challenges Google, Amazon With New Echo-Like Device", Bloomberg Technology, Jul. 5, 2017, 3 pages.

Clover, Juli, "Amazon and Google Want to Turn Their Smart Home Speakers Into Telephone Replacements", MacRumors, Feb. 15, 2017, 5 pages.

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017, 2 pages.

Constine, Josh "Facebook Starts Allowing 'Sponsored Messages' ads", Apr. 12, 2016, 7 pages.

Crist, Ry, "Logitech Harmony's Alexa Skill just got a whole lot better", cnet, Jul. 13, 2017, 2 pages.

Estes, "Amazon's Newest Gadget Is a Tablet That's Also an Echo", Gizmodo, Sep. 19, 2017, 3 pages.

Foghorn Labs, "10 Tips to Improve the Performance of Google Product Listing Ads," printed from Internet address: http://www.foghornlabs.com/2012/11/21/product-listing-ads-best-practices/, on Mar. 18, 2013, 5 pages.

Forrest, Conner, "Essential Home wants to be 'bridge' between Amazon Alexa, Apple's Siri, and Google Assistant," TechRepublic, May 31, 2017, 9 pages.

Foxx, Chris, "Apple reveals HomePod smart speaker", BBC News, Jun. 5, 2017, 6 pages.

Gebhart, Andrew, "Google Assistant is spreading, but it needs its own Echo Dot", cnet, May 20, 2017, 7 pages.

Gebhart, Andrew, "Google Home to the Amazon Echo: 'Anything you can do . . . '", cnet, May 18, 2017, 7 pages.

Gibbs, Samuel, "Your Facebook Messenger app is about to be filled with ads", The Guardian, Jul. 12, 2017, 3 pages.

Golgowski, Nina, "This Burger King Ad Is Trying to Control Your Google Home Device", Huffpost, Apr. 12, 2017, 7 pages.

Google Developers, "GoogleAssistant SDK" reprinted from https://developers.google.com/assistant/sdk/ on Aug. 22, 2017, 4 pages.

Google Inc., "Products Feed Specification," printed from Internet address: http://www.support.google.com/merchants/bin/answer.py?hl=en&answer=188494#US, on Mar. 18, 2013, 6 pages.

Google Inc., "Supported File Formats," printed from Internet address: http://www.support.google.com/merchants/bin/answer.py?hl=en&answer=160567, on Mar. 18, 2013, 1 page.

Gurman, et al., "Apple Is Manufacturing a Siri Speaker to Outdo Google and Amazon", Bloomberg, May 31, 2017, 5 pages.

(56) References Cited

OTHER PUBLICATIONS

Hardwick, Tim, "Facebook Smart Speaker Coming Next Year With 15-inch Touch Panel", MacRumors, Jul. 25, 2017, 5 pages.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017, 8 pages.
Klimontovich, Vladimir, Bot Influencers are The Programmatic Future of Conversational Advertising:, Jul. 21, 2016, 13 pages.
Koetsier, John, "Ads on Amazon Echo: Wendy's, ESPN, and Progressive Among Brands Testing", Forbes, May 11, 2017, 2 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017, 3 pages.
Lee, Take Two for Samsung's troubled Bixby assistant, BBC News, Oct. 19, 2017, 6 pages.
Lee, Dave, "The five big announcements from Google I/O", BBC News, May 18, 2017, 9 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Neff, Jack "What a Chatbot Can Teach you About Hair", published on Mar. 10, 2017, 8 pages.
Nieva, Richard, "Google Home and eBay can tell you how much that's worth", cnet, Mar. 8, 2017, 3 pages.
U.S. Notice of Allowance for U.S. Appl. No. 13/957,648 dated Dec. 16, 2015, 13 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017, 6 pages.
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017, 3 pages.
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017, 6 pages.
Porter, Jon, "Amazon Echo Show release date, price, news and features", Techradar, Jun. 26, 2017, 14 pages.
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017, 6 pages.
Seifert, Dan, "Samsung's new virtual assistant will make using your phone easier", The Verge, Mar. 20, 2017, 6 pages.
Sherr, Ian, "IBM built a voice assistant for cybersecurity", cnet, Feb. 13, 2017, 2 pages.
Siegal, Daniel, "IP Attys Load Up Apps' Legal Challenges At 'Silicon Beach'", Law360, Los Angeles, California, Feb. 2, 2017, 4 pages.
Smith, Dave, "The Amazon Echo got 2 incredibly useful features thanks to a new update", Business Insider, Jun. 1, 2017, 5 pages.
Unknown Author, "'Dolphin' attacks fool Amazon, Google voice assistants", BBC News, Sep. 7, 2017, 8 pages.
U.S. Non-Final Office Action for U.S. Appl. No. 13/957,648 dated Mar. 24, 2015, 12 pages.
U.S. Non-Final Office Action for U.S. Appl. No. 15/059,035 dated Dec. 21, 2016, 17 pages.
U.S. Non-Final Office Action for U.S. Appl. No. 15/059,035 dated Sep. 8, 2016, 11 pages.
U.S. Notice of Allowance for U.S. Appl. No. 15/059,035 dated Apr. 12, 2017, 13 pages.
U.S. Notice of Allowance for U.S. Appl. No. 15/667,802 dated Mar. 14, 2018, 9 pages.
U.S. Office Action for U.S. Appl. No. 15/667,802 dated Oct. 17, 2017, 14 pages.
Willens, Max, "For publishers, Amazon Alexa holds promise but not much money (yet)", Digiday, Jul. 6, 2017, 6 pages.

* cited by examiner

GENERATING CUSTOMIZED CONTENT

CROSS REFERENCE TO RELATED APPLICATIONS

This application claims the benefit of priority under 35 U.S.C. § 120 as a continuation of U.S. patent application Ser. No. 15/667,802, filed Aug. 3, 2017, and titled "GENERATING CUSTOMIZED CONTENT," which claims the benefit of priority under 35 U.S.C. § 120 as a continuation of U.S. patent application Ser. No. 15/059,035, filed Mar. 2, 2016, and titled "GENERATING CUSTOMIZED CONTENT," which claims the benefit of priority under 35 U.S.C. § 120 as a continuation of U.S. patent application Ser. No. 13/957,648, filed Aug. 2, 2013, and titled "GENERATING CUSTOMIZED CONTENT," which claims the benefit of the priority under 35 U.S.C. § 119(e) of U.S. Provisional Application Ser. No. 61/707,539, filed Sep. 28, 2012, and titled "GENERATING CUSTOMIZED CONTENT", each of which is incorporated herein by reference in its entirety.

BACKGROUND

This disclosure relates generally to generating customized content.

The Internet provides access to a wide variety of resources. For example, video, audio, and Web pages are accessible over the Internet. These resources present opportunities for other content (e.g., advertising or non-advertising content, such as audio, video, or the like) to be provided with the resources. For example, a Web page can include slots in which content can be presented. Similarly, such slots can be part of television programming.

Slots can be allocated to content providers (e.g., advertisers). In some systems, a network can be used to allocate content to the slots based, e.g., on various factors relating to the content and the context in which it is to be presented. For example, the content can be allocated based, in part, on keywords input to a system, such as a search engine. An auction can be performed for the right to present advertising in a slot. In the auction, content sponsors provide bids specifying amounts that the content sponsors are willing to pay for presentation of their content. Typically, the winning bidder is given the right to present content.

Web site-based advertisements ("ads") are sometimes presented to their advertising audience in the form of "banner ads"—e.g., a rectangular box that includes graphic components. When a member of the advertising audience (a "viewer") selects one of these banner ads by clicking on it, embedded hypertext links typically direct the viewer to the advertiser's Web site.

SUMMARY

Example techniques for generating customized content may include the following operations: receiving a search query from a computing device associated with a user; performing a search of electronic content based on the search query; obtaining a search result based on the search of electronic content; obtaining configurable content that relates to the search query, where the configurable content includes a field that is configurable; identifying user-specific content based on the search query; configuring the field of the configurable content based on the user-specific content to thereby produce configured content; and outputting data corresponding to the search result and the configured content for use in generating a Web page containing the search result and the configured content. The example techniques may include one or more of the following features, either alone or in combination.

The example techniques may include obtaining one or more conditions under which the configured content is to be output to the user. The search result and the configured content may be output in accordance with the one or more conditions. The one or more conditions may correspond to a time during which the configured content is to be output. The one or more conditions may correspond to a proximity to a location that triggers output of the content.

The content may include advertising, the field may include a text field, and the user-specific content may include information obtained from a profile of the user and/or information obtained from a social network of the user.

Identifying user-specific content that corresponds to the search query may include determining a factor that is relevant to the search query, and performing a search for user-specific content based on the factor. The user-specific content may be identified based on the search. Determining the factor may include consulting a database that correlates factors to query content.

Identifying user-specific content that corresponds to the search query may include obtaining metadata from the electronic content that relates to the search query; and performing a search for user-specific content based on the metadata. The user-specific content may be identified based on the search.

The search result may include at least one of a Web page and a set of search results comprised of links to Web pages.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are techniques for generating customized content, such as customized advertisements. The processes may include receiving a search query from a computing device associated with a user. For example, the user may enter keywords into a search engine in order to perform an online search for electronic content associated with those keywords. The processes may also identify user-specific content. For example, the user-specific content may be information about the user that is relevant to the original keywords. For example, if the user is searching for life insurance, then the user-specific content may be the user's age. More specifically, a person's age may be a relevant factor in determining what types of life insurance best fits their needs. In another example, if the user is searching for information about sports, then the user-specific content may be the person's alma mater. More specifically, a person's alma mater may be a relevant factor in determining which teams that the person is interested in following. The user-specific content may also be based on the user's social connections.

The processes also include obtaining content that relates to the search query. The content may be, e.g., advertising that includes a field that is configurable. The field of the electronic content may be configured based on the user-specific content. For example, the content may be an ad for life insurance that includes a text field, along with a message. The processes may incorporate the user's age into the text field, thereby providing a customized ad for life insurance that includes a customized message, e.g., "Happy 25th Birthday, John Smith. Please check out our newest life insurance product for people in their 20's". Such a customized ad may be output, e.g., along with search results or along with content (e.g., a Web page) provided as a result of searching.

In some implementations, the personalized content may be served for a time that relates to the user-specific content. For example, if the user-specific content relates to a person's birthday, content (e.g., an ad) may be directed to the user for a period before and after their birthday. If the user-specific content relates to a person's alma mater, the content (e.g., an ad) may be directed to the person for a period of time before and after a major sporting event for that alma mater. Alternatively, the content (e.g., an ad) may be directed to the person while that person is in a geographic proximity of their alma mater, during their alma mater's homecoming week, during their alma mater's reunion week, and so forth.

The processes described herein may be implemented in any appropriate network environment, with any appropriate devices and computing equipment. An example of such an environment is described below.

Figure 1:
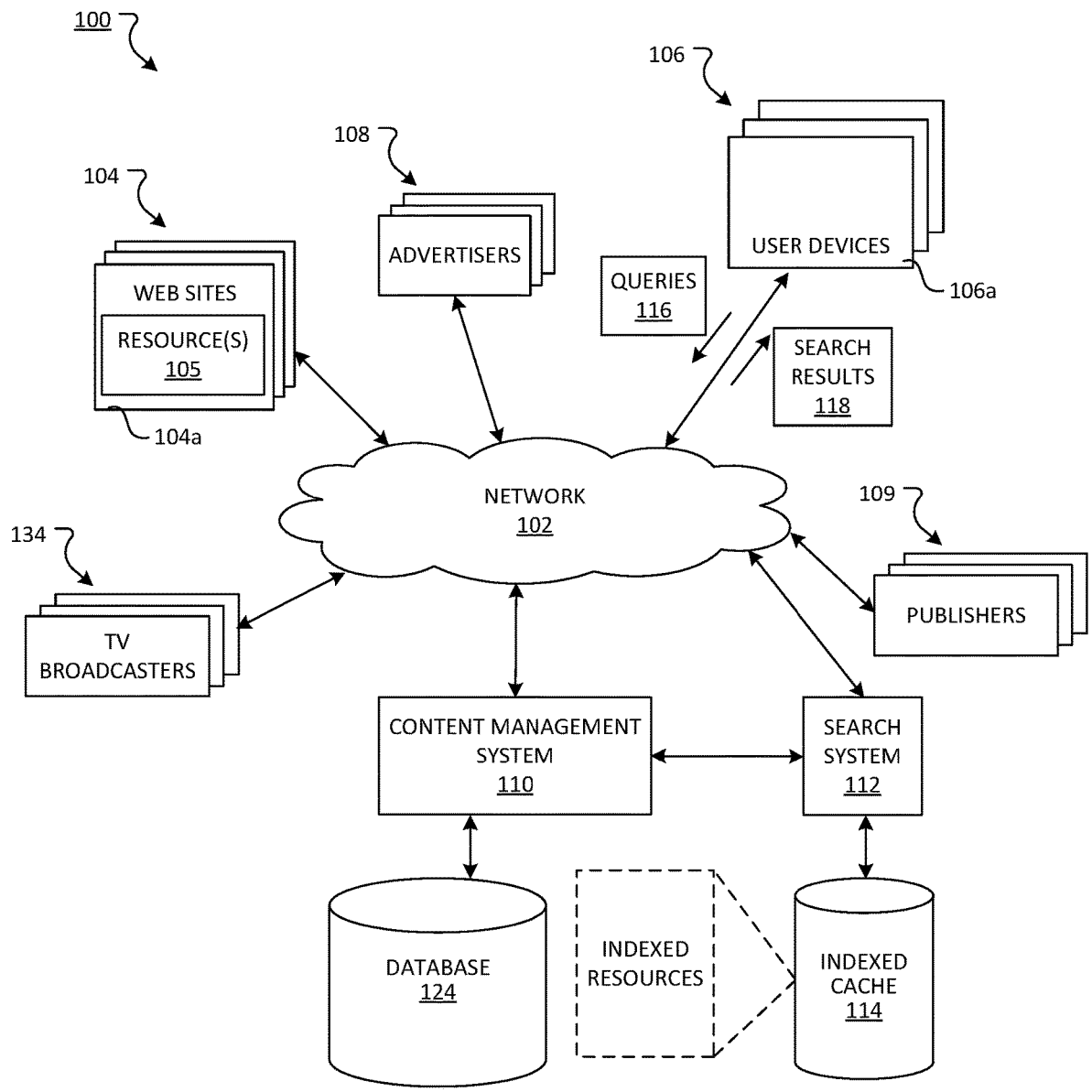
FIG. 1 is a block diagram of an example system for distributing content to users over a network.

FIG. 1 is a block diagram of an example network environment 100 that may be used in the processes described herein for generating customized content (e.g., personalized ads), and for directing that customized content to users under appropriate circumstances (e.g., during specific time periods, at particular geographic locations, during specific events, etc.).

As shown in FIG. 1, network 102 connects various entities, such as Web sites 104, user devices 106, content providers (e.g., advertisers 108), online publishers 109, television broadcasters 134, and a content management system 110. In this regard, example environment 100 may include many thousands of Web sites 104, user devices 106, and content providers (e.g., advertisers 108). Entities connected to network 102 include and/or connect through one or more servers. Each such server may be one or more of various forms of servers, such as a Web server, an application server, a proxy server, a network server, or a server farm. Each server can include one or more processing devices, memory, and a storage system.

Network 102 can represent a communications network that can allow devices, such as a user device 106a, to communicate with entities on the network. Network 102 can include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, WiFi, or other such transceiver.

In FIG. 1, Web sites 104 may include one or more resources 105 associated with a domain name and hosted by one or more servers. An example Web site 104a is a collection of Web pages formatted in hypertext markup language (HTML) that can contain text, images, multimedia content, and programming elements, such as scripts. Each Web site 104 can be maintained by a publisher 109, which is an entity that controls, manages and/or owns the Web site 104.

A resource 105 may be any appropriate data that can be provided over network 102. A resource 105 can be identified by a resource address that is associated with the resource 105. Resources 105 can include HyperText Mark-up Language (HTML) pages, word processing documents, portable document format (PDF) documents, images, video, and news feed sources, to name a few. Resources 105 can also include content, such as words, phrases, images, video and sounds, that may include embedded information (such as meta-information hyperlinks) and/or embedded instructions (such as JavaScript scripts).

To enable searching of resources 105, environment 100 can include a search system 112, as described below, that identifies resources 105 by crawling and indexing resources 105 provided by the content publishers on the Web sites 104. Data about the resources 105 can be indexed based on the resource 105 to which the data corresponds. Indexed and, optionally, cached copies of the resources 105 that match input keywords can be retrieved and output.

An example user device 106a is an electronic device that is under control of a user and that is capable of requesting and receiving resources over the network 102. A user device may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the user device can be included as part of a motor vehicle (e.g., an automobile, an emergency vehicle (e.g., fire truck, ambulance), a bus).

User device 106a can request resources 105 from a Web site 104a. In turn, data representing the resource 105 can be provided to the user device 106a for presentation by the user device 106a. User devices 106 can also submit search queries 116 to the search system 112 over the network 102. A request for a resource 105 or a search query 116 sent from a user device 106 can include an identifier, such as a cookie, identifying the user of the user device.

In response to a search query 116, the search system 112 can access a search index to identify resources 105 that are relevant to the search query 116. As described below, the search system 112 identifies resources 105 in the form of search results 118 and returns the search results 118 to a user device 106 in search results pages. A search result 118 may include data generated by search system 112 that identifies a resource 105 that is responsive to a particular search query 116, and that includes a link to the resource 105. An example search result 118 can include a Web page title, a snippet of text or a portion of an image extracted from the Web page, and the URL (Unified Resource Location) of the Web page.

Content management system 110 may be used for selecting and providing content in response to requests for content. Content management system 110 also can update database 124 based on activity of a user. In this regard, the database 124 can store a profile for the user which includes, for example, information about past user activities, such as visits to a place or event, past requests for resources 105, past search queries 116, other requests for content, social network profiles and connections, Web sites visited, or interactions with content. In some implementations, the information in database 124 can be derived, for example, from one or more of a query log, an advertisement ("ad") log, or requests for content. The database 124 can include, for each entry, a cookie identifying the user, a timestamp, an IP (Internet Protocol) address associated with a requesting user device 106, a type of usage, and details associated with the usage.

When a resource 105 or search results 118 are requested by a user device 106, content management system 110 can receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or Web page, in which content can be presented. An example slot is an ad slot. Search results pages can also include one or more slots in which other content items (e.g., ads) can be presented.

Information about slots can be provided to content management system 110. For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116. For example, the content management system identifies content, such as advertising, that is associated with keywords that match, or are substantially similar to, the input keywords (e.g., are a variant of the keywords, such as "car" or "cars"). When a match is detected, content management system 110 outputs the corresponding content. The processes described herein may be used to serve customized ads based, e.g., on input keywords or other search query content.

Based at least in part on data included in a request, content management system 110 can select content that is eligible to be provided in response to the request (referred to as "eligible content items"). For example, eligible content items can be eligible ads having characteristics matching the characteristics of ad slots and that are associated with user-provided keywords (e.g., terms in the input search query). The universe of eligible content items (e.g., ads) can be narrowed by taking into account other factors, such as the content of previous search queries 116. For example, content items corresponding to historical search activities of the user including, e.g., search keywords used, particular content interacted with, sites visited by the user, etc. may also be used in the selection of eligible content items by the content management system 110.

Content management system 110 can select the eligible content items that are to be provided for presentation in slots of a resource 105 or search results page 118 based, at least in part, on results of an auction. For example, for eligible content items, content management system 110 can receive bids from content providers (e.g., advertisers 108) and allocate slots, based at least in part on the received bids (e.g., based on the highest bidders at the conclusion of the auction). The bids are amounts that the content providers are willing to pay for presentation (or selection) of their content with a resource 105 or search results page 118. For example, a bid can specify an amount that a content provider is willing to pay for each 1000 impressions (i.e., presentations) of the content item, referred to as an ECPM bid. Alternatively, the bid can specify an amount that the content provider is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

In some implementations, a content provider can bid for a targeted audience of users. For example, one or more of the publishers 109 and/or the content management system 110 may provide one or more audiences of users, where each user in the audience matches one or more targeting criteria, such as matching one or more demographics. An audience of users may be represented, for example, as a user list. User lists or other representations of audiences may be stored, for example, in a database 124. A bid from a content provider can specify, for example, an amount that the content provider is willing to pay for each 1000 impressions (i.e., presentations) of the content item to a particular audience of users. The content management system 110 may, for example, manage the presentation of the content item to users included in a particular audience and may manage charging of the content provider for the impressions and distributing revenue to the publishers 109 based on the impressions.

In some implementations, TV (Television) broadcasters 134 produce and present television content on TV user devices (not shown), where the TV content may be organized into one or more channels. The TV broadcasters 134 may include, along with the TV content, one or more content slots in which other content (e.g., advertisements) may be presented. For example, a TV network may sell slots of advertising to advertisers in TV programs that they broadcast. Some or all of the content slots may be associated with keywords that relate, e.g., to the television programs in broadcast on a particular channel.

Figure 2:
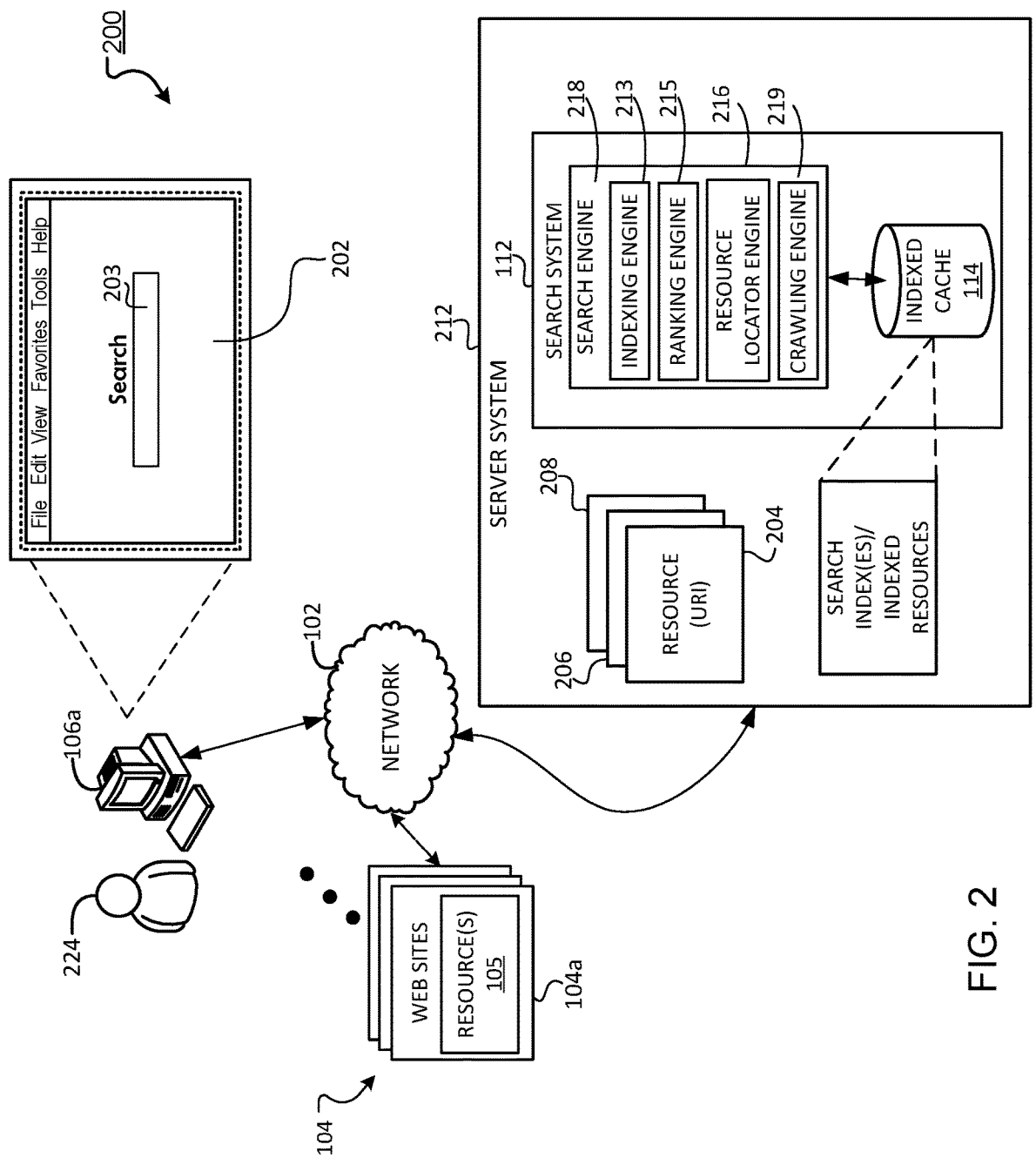
FIG. 2 is a block diagram of a portion of the system of FIG. 1.

FIG. 2 is a block diagram of an example part of the network environment 100 of FIG. 1. Specifically, FIG. 2 shows portion 200 of example network environment 100. In this example implementation, server system 212 stores resources 204, 206, 208. A resource has an associated resource identifier (Resource ID). For example, resources 204, 206, 208 may correspond to different Web pages of the same Web site, or may correspond to Web pages of different Web sites. As explained below, in this example operation, computing device 106a communicates with server system 212 to display a home Web page ("home page") 202 of a search engine Web site and a home page of a social network.

To view a Web page, user 224 may input or select a Resource ID using a Web browser that is executed on computing device 106a. The Resource ID may include, for example, a URI or a uniform resource locator (URL). A request including the Resource ID is transmitted from computing device 106a to server system 212 over network 102. In response, the server system identifies the requested resource based on the Resource ID, and transmits the requested resource to computing device 106a over network 102. For example, the resource may be a home page of a social network or a home page 202 of search system 112. In some implementations, search system 112 is part of the social network or it is independent thereof yet able to access content from the social network.

Page 202 for search system 112 may include a field 203 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 112 may be implemented, e.g., on server system 212 as shown or on other appropriate hardware. Search system 112 includes a search engine 218 and one or more search indexes. Search system 112 identifies resources 105 (e.g., Web pages, images, news articles, user-generated content, social information (e.g., from a social network), or other public and/or private resources) provided by content publishers on Web sites 104a. Appropriate permission(s) may be required to access non-public content.

Search system 112 includes a crawling engine 219 to crawl resources, and an indexing engine 213 to index those resources in one or more search indexes (referred to collectively as "search index") stored, e.g., in indexed cache 114. Search engine 218 also includes a resource locator engine 216 for identifying resources within the search index that are responsive to, and that may be relevant to, a query (for example, by implementing a query text matching routine). A ranking engine 215 ranks resources deemed relevant to the search query.

Social graph information may be included in a same search index as other resources or in a separate search index (not shown). As described in more detail below, the social graph information may include, e.g., comments, endorsements, connections, affinities, and so forth related to indexed content and to a user's social graph. The social graph information may include content from a social network. A separate search may be performed for general search results responsive to a query, as well as particular search results, that identify resources associated with the user's social graph (e.g., endorsed Web content).

The social graph information may include, with appropriate permission, user account information for social networks. In some examples, the user account information can, for example, include user profile data, user acquaintances data, user groups data, user media data, and user options data. Other user data can also be included in, or associated with, social network user accounts.

The user profile data can, for example, include general demographic data about a user, such as age, gender, home location, birthday, alma mater, interests, etc. In some implementations, the user profile data can also include professional information, e.g., occupation, educational background, etc., and other data, such as contact information. In some implementations, the user profile data can include open profile data, e.g., free-form text that may be typed by the user into fields for various subjects, e.g., "Job Description," "Favorite Foods," "Hobbies," etc., and constrained profile data, e.g., binary profile data selected by check boxes, radio buttons, etc., or predefined selectable profile data, e.g., income ranges, zip codes, etc. In some implementations, some or all or the user profile data be classified as public or private profile data, e.g., data that can be shared publicly or data that can be selectively or otherwise not shared. In some implementations, use profile data not classified as private data can, for example, be classified as public data, e.g., data that can be viewed by any user accessing the social network.

The user acquaintances data can, for example, define user acquaintances associated with a user account. In some implementations, user acquaintances can include, for example, users associated with other user accounts that are classified as contacts or otherwise connected through a social graph.

The user groups data can, for example, define user groups to which a user account is associated. In an implementation, user groups can, for example, define an interest or topic, e.g., "Wine," "Open Source Chess Programming," "Travel Hints and Tips," etc. In some implementations, the user groups can, for example, be categorized, e.g., a first set of user groups can belong to an "Activities" category, a second set of user groups can belong to an "Alumni & Schools" category, etc.

The user media data can include one or more content items, such as user documents, e.g., Web pages. A document can, for example, include a file, a combination of files, one or more files with embedded links to other files, etc. The files can be of any type, such as text, audio, image, video, hyper-text mark-up language documents, etc. In the context of the Internet, a common content item is a Web page. Other content items can also be defined by the user media data.

The user options data can include data specifying user options, such as electronic message settings, acquaintance notification settings, chat settings, password and security settings, etc. Other option data can also be included.

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content, including user social network account information) may be included in a same index as other resources or in a separate index, as noted above. In this regard, with appropriate permission, crawling engine 219 may crawl user-generated content (of both the searcher and others, e.g., members of the searcher's social graph), and indexing engine 213 may incorporate that content into an appropriate search index. Resource locator engine 216 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 218 may access indexed cache 114 to identify resources 105 that are relevant to the search query. Resource locator engine 216 may identify resources 105 in the form of search results and return the search results to a requesting device in search results pages. A search result may include data generated by search system 112 that identifies a resource 105, and that includes a link to the corresponding resource, along with images, video, or other appropriate content. An example search result may include a Web page title, a snippet of text or a portion of an image extracted from the Web page, and the URL of the Web page. In some cases, the search results may also include social information. For example, included with some of the search results may be comments, endorsements, or other information obtained about the search results from a user's social graph. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other.

In still other examples, if two users interact with the same people regularly or frequently, those two users may be considered to have an affinity with one other.

Figure 3:
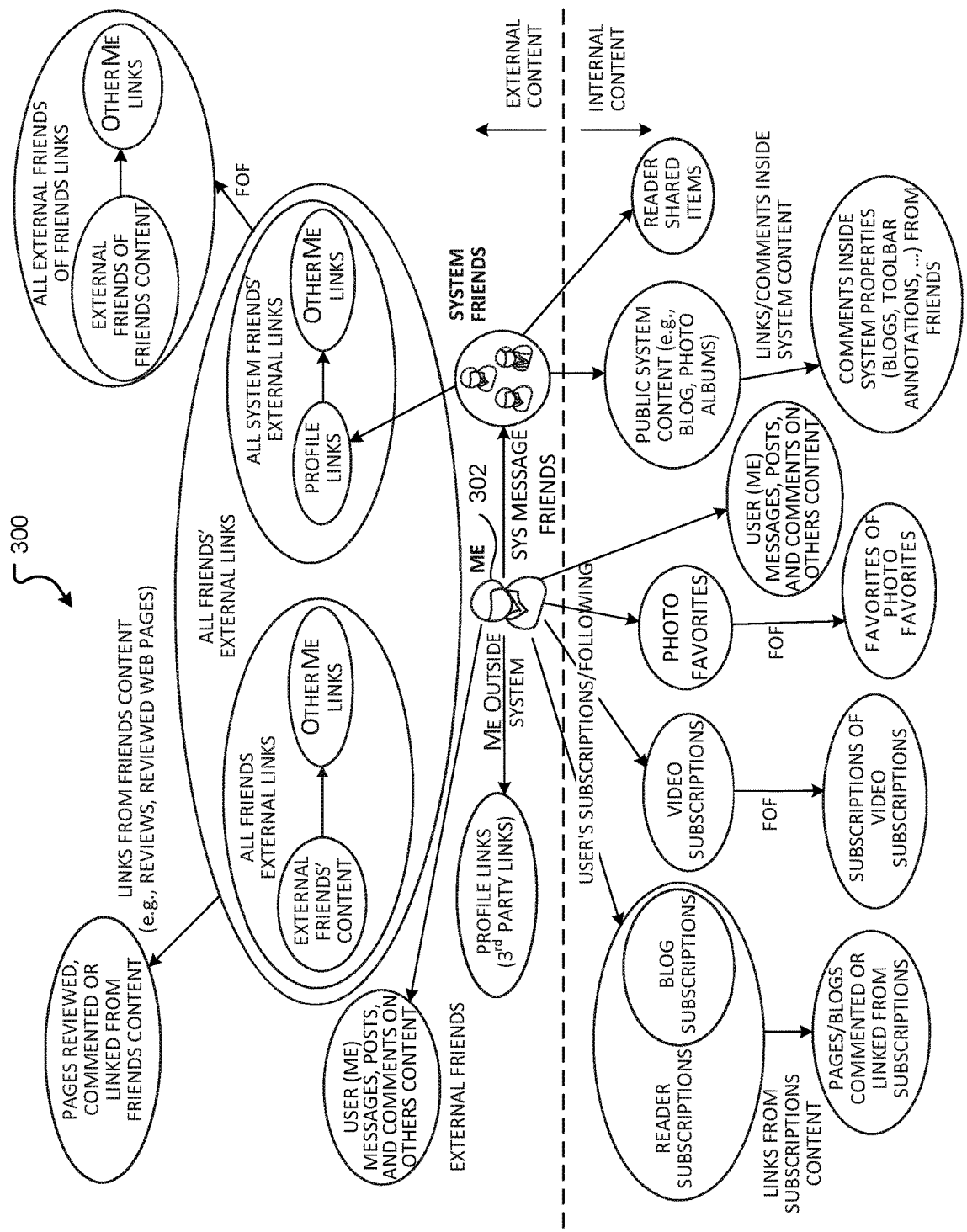
FIG. 3 is an example of a social graph.

FIG. 3 is a conceptual view of an example social graph 300. Among other things, FIG. 3 shows sources of information for a social graph. In this example, the user's social graph is a collection of connections (e.g., users, resources/content, etc.) identified as having a relationship to the user 302 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 3 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 114 of FIGS. 1 and 2. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an available option or by keeping contacts out of particular groups used to generate the social graph. In some implementations, privacy features provide a user with option to allows or to prevent, respectively, being included (or removed the user if already included) as a member of another's social graph. Thus, users may have control over what personal information or connection information, if existing, is included in their social graphs and, consequently, that is included in the content streams and search results described herein.

Figure 4:
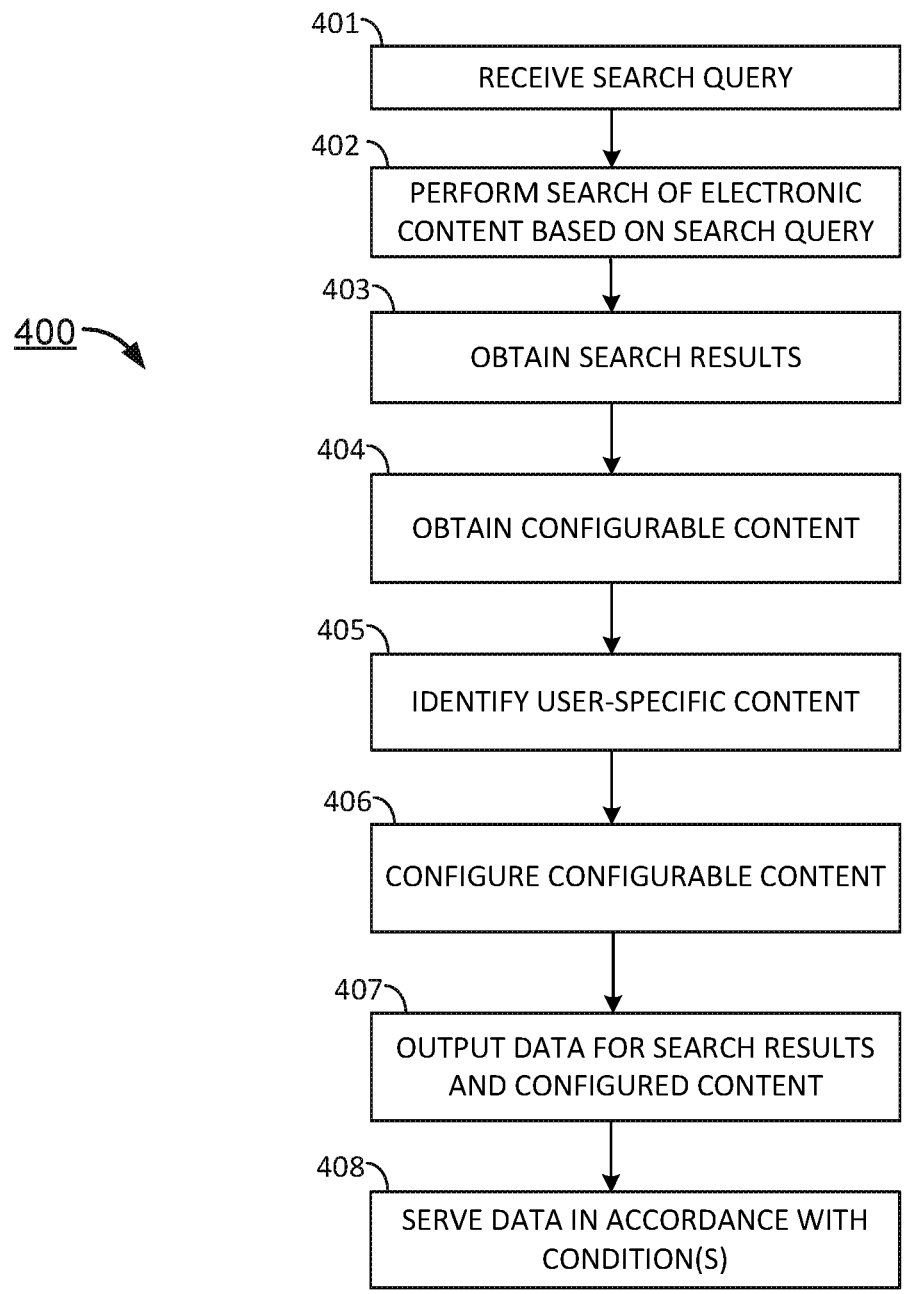
FIG. 4 is an example process for distributing content to users.

FIG. 4 is a flow chart showing an example process 400 for generating and distributing (e.g., serving) customized content, such as ads. Process 400 may be performed, e.g., by content management system 110, either alone or in combination with search system 112.

According to process 400, a search query is received (401) from a computing device (e.g., device 106a of FIG. 2). The search query may include content, such as keyword(s), image(s), audio, video, a combination thereof, etc. The search query may be used to perform a search of public content, such as the Web or publicly-available social network content. The search query may also be used to search private content, provided appropriate permission is obtained.

A search of electronic content is performed (402) based on the search query. For example, resource locator engine 216 may search an index in indexed cache 114 to locate electronic content that is relevant to the search query. For example, the search query may be for "life insurance", and the resulting search may obtain search results that are relevant to the query of "life insurance". In another example, the search may be for "State University", and the resulting search may obtain search results that are relevant to the query of "State University".

Through searching, one or more search results are obtained (403) that are relevant to the search query. In the above example, the search results may include a single Web page that is for a particular life insurance company or that is the home page for State University. In another example, the search results may include a list of hyperlinks to content (e.g., Web pages), along with appropriate snippets of corresponding content, images, video, and so forth.

Configurable content that relates to the search query is also obtained (404) as a result of the search. For example, content management system 110 may provide the configurable content. The configurable content may include, e.g., advertising or other content to be distributed electronically. The example described herein focuses on advertising (ads); however, the processes described herein are not limited to use with ads or any content in particular. In this example, a configurable ad includes one or more fields that are blank, and that may be populated with information. The information may be associated, in some way with the searcher who input the search query. For example, the information may include information from the user's profile (e.g., their age, proximity to a geographic location, likes, dislikes, and so forth). The information may be from the user's social graph. For example, the information may relate to a social contact of the user (e.g., identify a social contact of the user who has purchased a product being advertised in an ad, recommended a product being advertised in the ad, or otherwise has some association with the product being advertised in the ad).

In some examples, blank fields in the configurable content may be associated with metadata. The metadata may specify one or more content items that can populate the corresponding field(s). For example, the metadata may specify that a person's age is to be incorporated into a field, along with an appropriate message. For example, the field may include metadata to display the following message in the event that a query is for "life insurance", the user who input the query is a man over 20 years of age, and it is within five days of that user's birthday (either before or after):

"Happy Birthday <user name>!

We have a new product specifically designed for men who are <user age>."

In the above example, <user name> and <user age> are blank fields that can be populated with user-specific content, e.g., the user's name and age, respectively.

In some examples, the same ad may include different, selectable configurable messages. Scripts associated with the ad may be used select the appropriate message. For example, the same ad described above may include the following message, which is displayed in the event that a query is for "life insurance", the user who input the query is a man who attended State University, and the user is within ten miles of State University.

"Hi <user name>!

We have a new product specifically designed for <alma mater> alumni.

Go <team name>!"

In the above example, <user name>, <alma mater>, and <team name> are blank fields that can be populated with user-specific content, e.g., the user's name, alma mater (State University), and alma mater football team name, respectively. The script (or content management system 110) may select the appropriate ad content based, e.g., on content included with the search query, such as the user's location, on content from the user's profile, and/or on other user-specific content obtained as described herein.

According to process 400, user-specific content that corresponds to the search query may be identified (405). For example, if the search query is for "life insurance", the system may identify a user's age as a factor that is relevant to the query for life insurance. That user's age may be incorporated into a customizable field of an ad. In another example, if the query is for football, the system may identify a user's alma mater (but not their age) as a factor that is relevant to the query for football. The user's alma mater, or information relating thereto, may be incorporated into a customizable field of an ad.

In this regard, if an ad is for life insurance, the advertiser may identify, e.g., in the ad itself (as above) or in a table or other construct, a correlation between blank (customizable) fields in the ad and user-specific content that is appropriate to populate those fields. This user-specific content corresponds to the search query in the sense that it may be obtained either directly or indirectly as a result of entry of the search query into the search engine. For example, content management system 110 may maintain a database correlating key words (or other search query content) to configurable ads. The database may also specify user-specific content appropriate for inclusion in the configurable ads. For example, in the following example, an ad for life insurance may be:

"Happy Birthday <user name>!

We have a new product specifically designed for men who are <user age>."

In this example, the database may correlate the key words "life insurance" to a corresponding ad and to user-specific content (e.g., user name and user age) that needs to be retrieved to complete the ad. In another example, if a search query is for football and an ad is for sports paraphernalia, the database may correlate the key words (or other search query content) to a corresponding ad and to user-specific content (e.g., the user's alma mater, team name, and so forth) that needs to be retrieved to complete the ad. In these cases, resource locator engine 216 may obtain, from the database, information needed to generate a search query to identify, in the search index, information appropriate to complete the ad. For example, resource locator engine 216 may search for the user's name, age, location, and so forth.

In other implementations, as noted above, metadata may specify one or more content items that can populate corresponding blank field(s) of an ad. In this example, after such an ad is identified, resource locator engine 216 may obtain, from the metadata, information needed to generate a search query to identify, in the search index, information appropriate to complete the ad. For example, the search engine may search for the user's name, age, location, and so forth.

In some examples, the user-specific information may include information about parties to which the user is connected on their social graph. For example, ads may be configured to identify products, services, etc. that are the subject of the ad, and that have some connection to others on the user's social graph. For instance, an ad may include a field to indicate how many parties of the user's social graph have purchased the corresponding product, have viewed a Web site associated with the ad, have commented-on, endorsed, or otherwise discussed the ad or the product associated with the ad, and so forth. Such information may be obtained, with appropriate permission, by resource locator engine 216, e.g., from a search index in indexed cache 114. Any appropriate information associated with the user's social graph described herein (e.g., with respect to FIG. 3) may be used to configure an ad according to process 400.

In some examples, a user's profile and/or social network may be searched for factors relating to a search query. For example, if it is known that the user is connected, socially, to a number of life insurance agents, the names and contacts of those life insurance agents may be identified in response to an original query for "life insurance", and that information may be incorporated into appropriate fields of a configurable ad for life insurance. In this regard, in some examples, configurable ads may include blank fields that do not require specific content. Accordingly, the blank fields of such ads may be filled with content, such as that described above, that is obtained from the user's profile, social network, or elsewhere that is relevant to the original search query (and which, therefore, should is also relevant to the subject of the ad). In another example, if a user is in the market for an automobile, a social connection between the user and an automobile dealer may be identified based on a search for "XYZ cars", and information about that automobile dealer may be incorporated into an ad for a particular automobile. For example, if XYZ brand automobile provides ads, such ads may include a configurable field that may be populated with information about one or more local dealers for XYZ brand (or other appropriate brands) that have a social (or other) connection to the user.

Figure 5A:
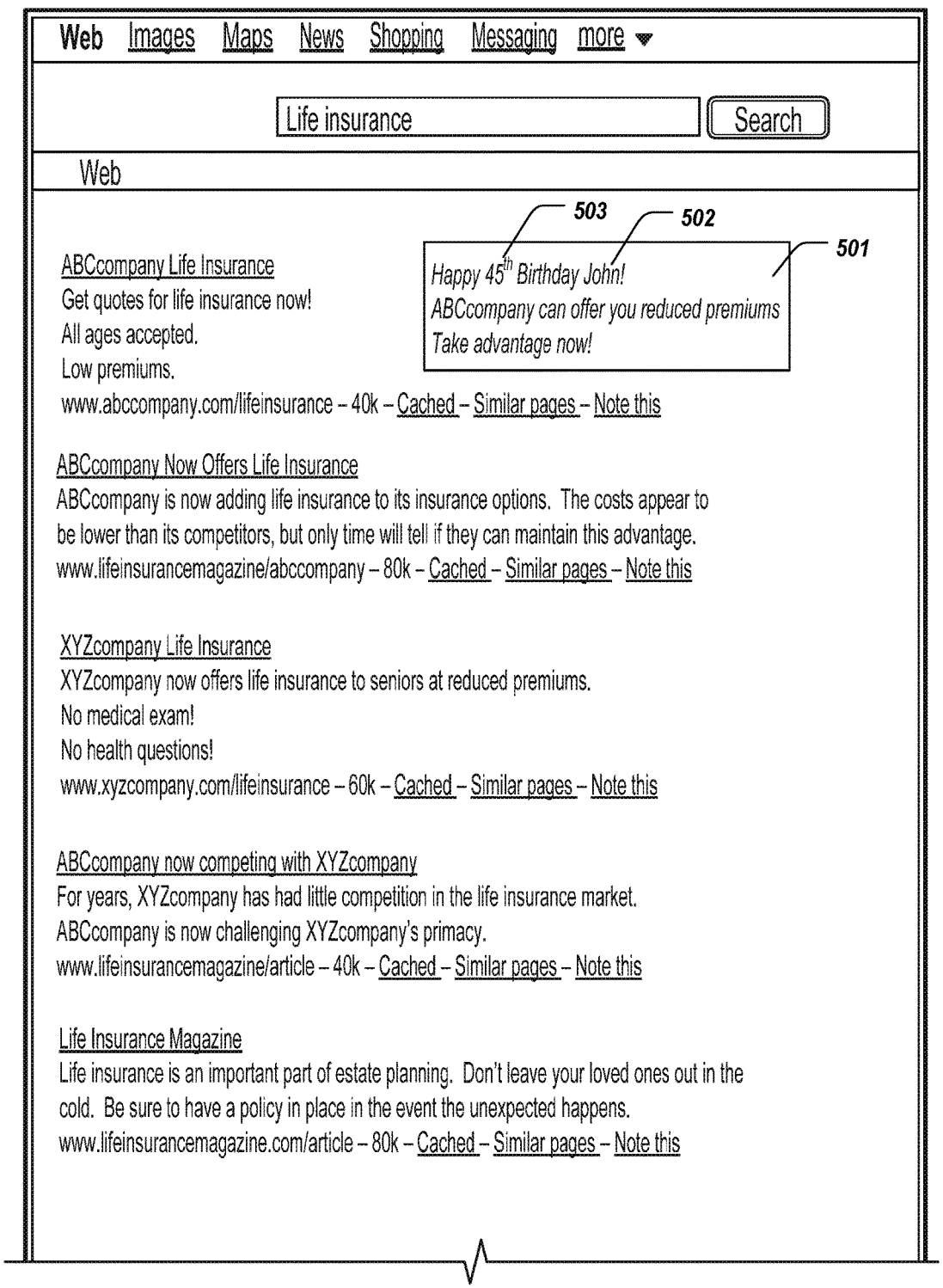
FIGS. 5A, 5B and 5C are examples of configured ads on Web pages.
Figure 5B:
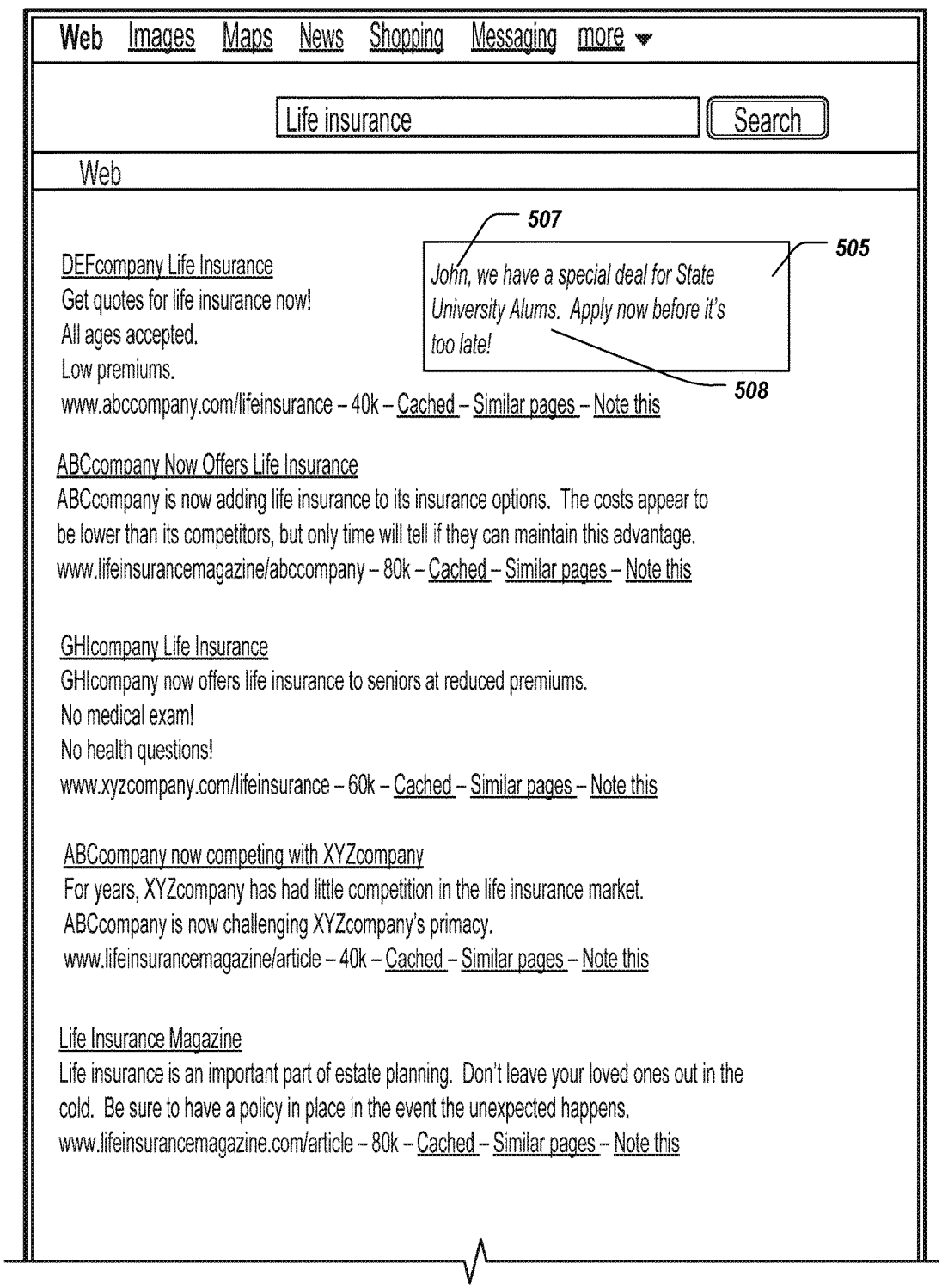
Figure 5C:
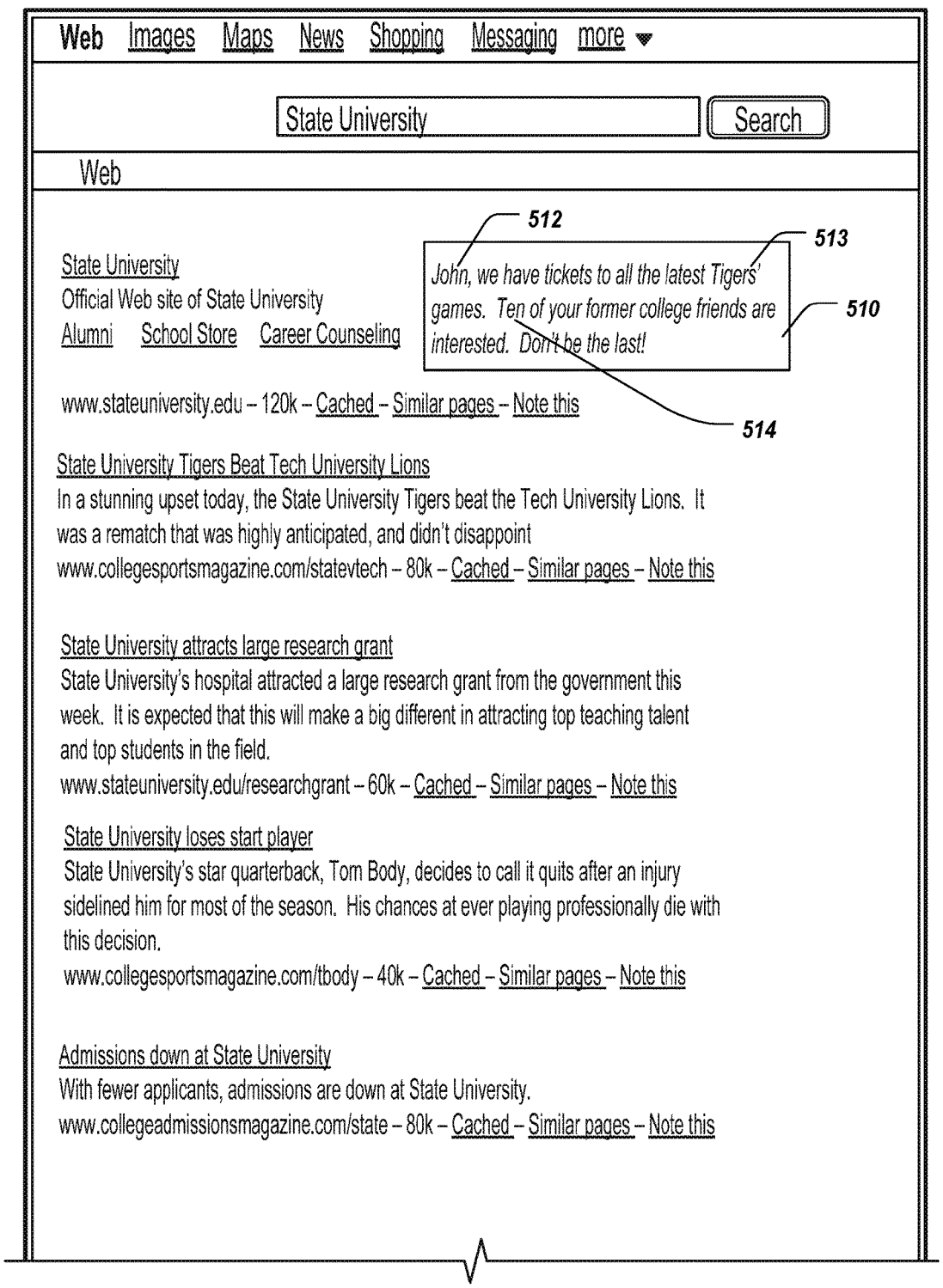

Referring back to FIG. 4, after the user-specific content has been identified (405) and obtained, the field(s) of the configurable ad are configured (406) based on the user-specific content. More specifically, in this example, the blank fields are completed by incorporating appropriate user-specific content into those fields. For example, referring to FIG. 5A, blank fields of ad 501 in search results Web page 500 are completed with user-specific content 502, 503 (name and birthday); referring to FIG. 5B, blank fields of ad 505 in search results Web page 506 are completed with user-specific content 507, 508 (name and alma mater); and referring to FIG. 5C, blank fields of ad 510 in search results Web page 511 are completed with user-specific content 512, 513, 514 (name, alma mater team, and number of contacts in a social network who have clicked-on the ad, respectively).

Data for the search results and configured ads is output (407), e.g., to the computing device of the user who performed the original search. The configured ad may be served (408) in accordance with one or more conditions (obtained, e.g., from an advertiser). For example, the configured ad may be served for a period before and after a specific time (e.g., for a number of days before and after a person's birthday). The configured ad may be served for a particular product at a particular location (e.g., for tickets to a sporting event at the home stadium of a user's alma mater). Generally speaking, an advertiser may direct how long, where, how often, and to whom the configured ads may be served in order to promote a particular product or service associated with the configured ad. Advertisers also my direct other conditions under which ads may be served.

In some examples, the configurable ads described herein need not be configured based on search queries. For example, ads presented on devices (e.g., computers or televisions) may be configured using information from user profiles, e.g., to promote a sports package to State University alumni for an upcoming football game. The configured ad may run, e.g., for a period of time up to, and including, the start time of the game. Likewise, ads provided on a social network or Web page may be configured based on information known about the user to whom the ad is presented.

Figure 6:
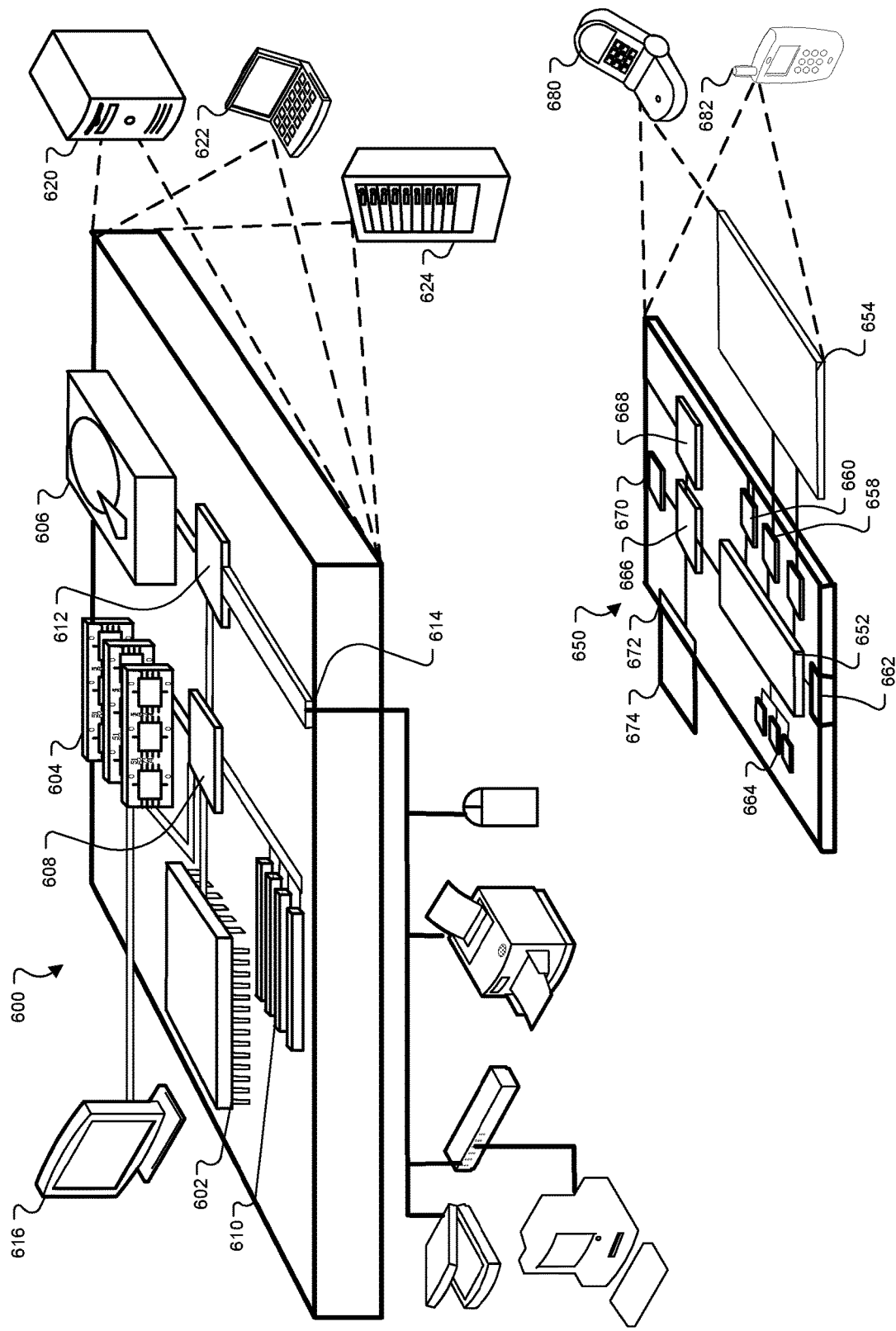
FIG. 6 shows examples of computing devices on which the processes described herein, or portions thereof, may be implemented.

FIG. 6 shows an example of a generic computing device 600 and a generic mobile computing device 650, which may be used to implement all or part of the processes described herein. For example, content management system 110 and search system 112 may be implemented by computing device 600 and mobile computing device 650 may implement a user device 106/106a of FIGS. 1 and 2. In this regard, computing device 600 is intended to represent various forms of digital computers, examples of which include laptops, desktops, workstations, personal digital assistants, servers, blade servers, mainframes, and other appropriate computers. Computing device 650 is intended to represent various forms of mobile devices, examples of which include personal digital assistants, cellular telephones, smartphones, and other similar computing devices. The components shown here, their connections and relationships, and their functions, are meant to be examples, and are not meant to limit the scope of the appended claims.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, for example, display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, examples of which include a magnetic or optical disk.

The storage device 606 is capable of providing mass storage for the computing device 600. In one implementation, the storage device 606 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is an example. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer, for example, a laptop computer 622. Alternatively, components from computing device 600 may be combined with other components in a mobile device (not shown), for example, device 650. Each of such devices may contain one or more of computing device 600, 650, and an entire system may be made up of multiple computing devices 600, 650 communicating with each other.

Computing device 650 includes a processor 652, memory 664, an input/output device for example, a display 654, a communication interface 666, and a transceiver 668, among other components. The device 650 may also be provided with a storage device, for example, a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, for example, control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, for example, using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, for example, through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A system to generate customized content, comprising:
 a server system including at least one processor to:
  receive audible information from a computing device including an audio request to provide content results to the computing device;
  convert the audible information into digital information including the audio request to provide the content results to the computing device;
  obtain, responsive to the conversion of the audible information, configurable content for delivery to the computing device with the content results, the configurable content including a configurable text field including at least one replaceable blank text field;
  retrieve insertable content from social graph information for an account of the computing device, the social graph information indexing internal content and external content for the account;
  generate configured text by replacing the at least one replaceable blank text field with text based on the insertable content from the social graph information;
  produce configured content including the configured text; and
  provide the configured content to the computing device for display.

2. The system of claim 1, comprising the server system to replace the at least one replaceable blank text field with text based on the content in accordance to metadata specified for the configurable content.

3. The system of claim 1, comprising the server system to retrieve the insertable content from the social graph information for the account of the computing device, the social graph information indexed by mapping identified information to web resources.

4. The system of claim 1, comprising the server system to retrieve the insertable content based on metadata associated with the audible information.

5. The system of claim 1, comprising the server system to retrieve the insertable content including social network information obtained from the social graph information based on a permission to access private social network information.

6. The system of claim 1, comprising the server system to provide the content results to the computing device to cause the computing device to generate audible sound corresponding to the content results.

7. The system of claim 1, comprising the server system to:
 obtain a condition under which to provide the configured content to the computing device, the condition including at least one of a predetermined period of time relative to a date listed in the content and a predetermined distance of a location listed in the content; and
 provide the configured content to the computing device in accordance with the condition.

8. The system of claim 1, comprising the server system to provide the content results to the computing device to cause the computing device to present text corresponding to the content results.

9. The system of claim 1, wherein the content comprises information about parties to which the computing device is connected via the social graph information.

10. The system of claim 1, wherein the configurable text field is associated with metadata indicating an appropriate message type for the configurable text field.

11. The system of claim 1, comprising the server system to retrieve, from a database associated with a provider of a social network, the social graph information.

12. A method of generating customized content, comprising:
- receiving, by a server system, audible information from a computing device including an audio request to provide content results to the computing device;
- converting, by the server system, the audible information into digital information including the audio request to provide the content results to the computing device;
- responsive to converting the audible information, obtaining, by the server system, configurable content for delivery to the computing device with the content results, the configurable content including a configurable text field including at least one replaceable blank text field;
- retrieving, by the server system, insertable content from social graph information for an account of the computing device, the social graph information indexing internal content and external content for the account;
- generating, by the server system, configured text by replacing the at least one replaceable blank text field with text based on the insertable content from the social graph information;
- producing, by the server system, configured content including the configured text; and
- providing, by the server system, the configured content to the computing device for display.

13. The method of claim 12, comprising
retrieving, by the server system, the insertable content based on metadata associated with the audible information.

14. The method of claim 12, comprising
retrieving, by the server system, the insertable content from the social graph information for the account of the computing device, the social graph information indexed by mapping identified information to web resources.

15. The method of claim 12, comprising:
retrieving, by the server system, the insertable content including social network information obtained from the social graph information based on a permission to access private social network information.

16. The method of claim 12, comprising:
obtaining, by the server system, from the computing device, an indication of a permission to access social network information.

17. The method of claim 12, comprising:
providing, by the server system, the content results to the computing device to cause the computing device to generate audible sound corresponding to the content results.

18. The method of claim 12, comprising:
obtaining, by the server system, a condition under which to provide the configured content to the computing device, the condition including at least one of a predetermined period of time relative to a date listed in the content and a predetermined distance of a location listed in the content; and
providing, by the server system, the configured content to the computing device in accordance with the condition.

19. The method of claim 12, wherein the configurable text field is associated with metadata indicating an appropriate message type for the configurable text field.

20. The method of claim 12, comprising retrieving, by the server system, from a database associated with a provider of a social network, the social graph information.

* * * * *